United States Patent Office 3,425,931
Patented Feb. 4, 1969

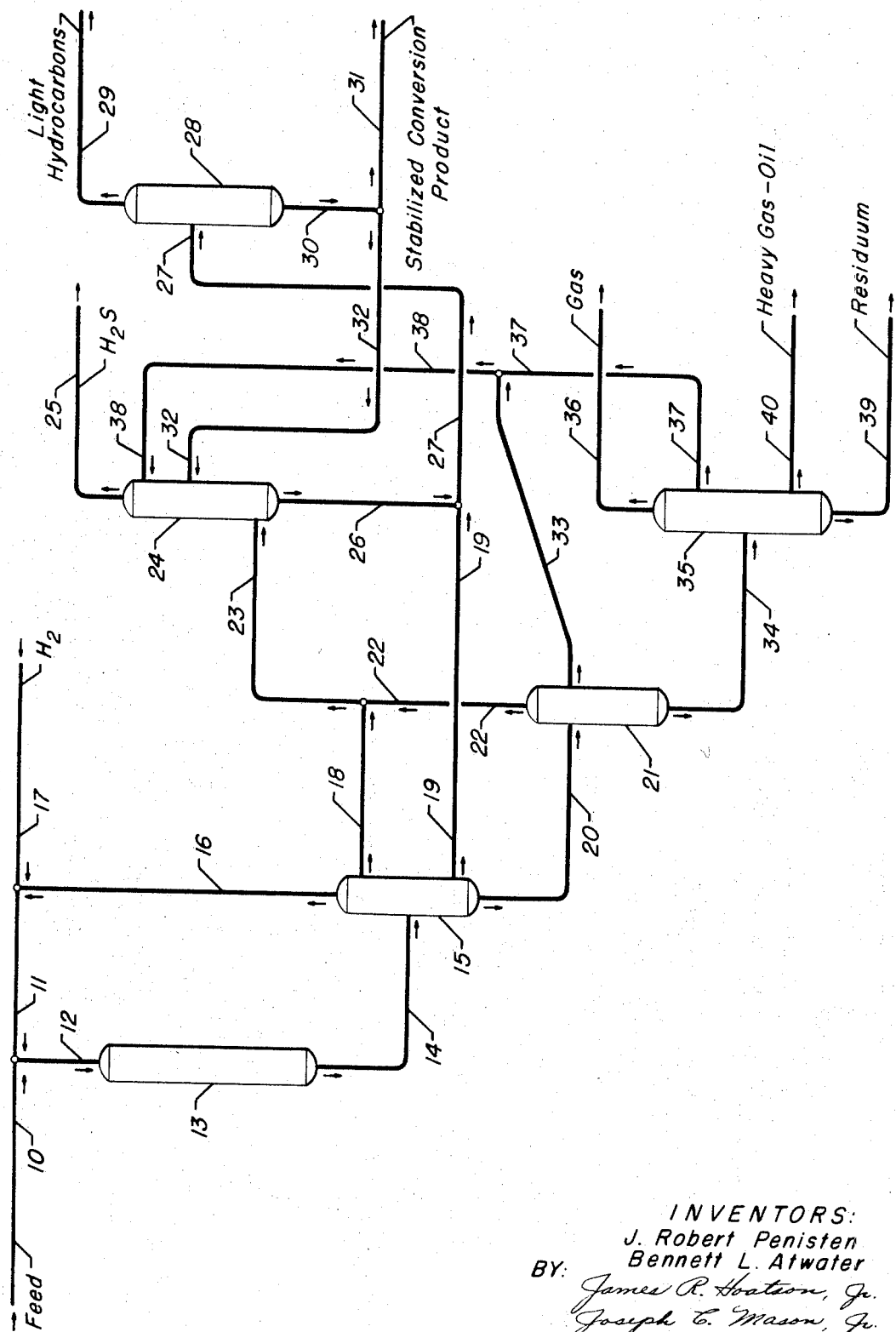

3,425,931
HYDROCARBON RECOVERY METHOD
J Robert Penisten, Palatine, and Bennett L. Atwater, Elk Grove Township, Ill., assignors to Universal Oil Products Company, Des Plaines, Ill., a corporation of Delaware
Filed Dec. 5, 1966, Ser. No. 599,161
U.S. Cl. 208—101          10 Claims
Int. Cl. C10g 37/00, 25/00

ABSTRACT OF THE DISCLOSURE

Method for separating hydrogen, acid gas, and light hydrocarbons from other distillable hydrocarbons contained in the effluent of a catalytic hydrocracking reaction zone.

---

This invention relates to hydrocarbon conversion product recovery methods. It also relates to a method for recovering light hydrocarbons via absorption from gaseous mixtures. It specifically relates to a method for separating the distillable hydrocarbons present in the effluent from a residuum hydrocracking zone.

It is known in the art that useful hydrocarbon products may be obtained by converting hydrocarbons via the hydrocracking reaction. In recent times, the hydrocracking reaction has been applied successfully to residuum stocks, or relatively heavy hydrocarbons, in order to upgrade these stocks to more valuable products such as gasoline and fuel oil materials. In general, the hydrocracking reaction is effectuated by contacting the hydrocarbon feedstock in the presence of hydrogen with a suitable catalyst at elevated temperatures and pressures. The effluent from such a reaction is typically passed into a high pressure separation zone for recovering the unreacted hydrogen for other use or for recycle to the reaction zone, with subsequent separation and recovery of the distillable hydrocarbon products via distillation means.

However, it has been found that the hydrocracking reaction, particularly when applied to residuum stocks, produces an exorbitantly high amount of gas, such as the light hydrocarbons (methane, ethane, $C_3$'s, $C_4$'s, etc.), which generally are lost to the refinery fuel system due to an inability of the refiner to economically recover the light hydrocarbons therefrom.

Therefore, it is an object of this invention to provide an improved method for recovering relatively light hydrocarbons from a feed mixture containing acid gas, relatively light hydrocarbons, and relatively heavy hydrocarbons.

It is another object of this invention to provide an improved absorption method for recoving $C_3$–$C_4$ hydrocarbons from gaseous mixtures containing same.

It is still another object of this invention to provide an improved method for separating the distillable hydrocarbons present in the effluent from a residuum hydrocracking reaction zone.

These and other objects may be achieved by the present invention more fully described hereinbelow with reference to the attached diagram which is a schematic representation of one embodiment of the present invention.

According to the present invention, a method for recovering relatively light hydrocarbons from a feed mixture containing acid gas, relatively light hydrocarbons, and relatively heavy hydrocarbons, comprises separating said feed mixture under relatively high pressure and temperature conditions into a vapor fraction comprising acid gas and relatively light hydrocarbons and a liquid fraction comprising said relatively heavy hydrocarbons, separating the relatively heavy hydrocarbons into a lower boiling hydrocarbon stream and a higher boiling hydrocarbon stream, passing said vapor fraction into an absorption zone in contact with hereinafter specified absorption medium under conditions sufficient to absorb relatively light hydrocarbons into said medium, introducing said higher boiling stream into the upper section of said zone as part of said medium, introducing said lower boiling stream into an intermediate section of said zone as another part of said medium, removing acid gas from said zone, and recovering relatively light hydrocarbons from said absorption medium.

A particular embodiment of the present invention is a method for separating the effluent from a residuum hydrocracking reaction zone which comprises the steps of:

(a) passing said effluent at relatively high pressure and high temperature into first separation means to produce (i) a first gaseous fraction comprising hydrogen,
(ii) a second gaseous fraction containing acid gas and $C_1$ to $C_4$ hydrocarbons,
(iii) a first liquid fraction containing $C_3$ to 550° F. material, and,
(iv) a second liquid fraction containing 550° F.+ material;

(b) introducing said second liquid fraction into second separation means under conditions sufficient to produce (i) a third gaseous fraction containing acid gas and $C_1$ to $C_4$ hydrocarbons,
(ii) a third liquid stream containing $C_6$ to 550° F. material, and,
(iii) a fourth liquid stream containing 550° F.+ material;

(c) passing said second gaseous fraction and said third gaseous stream into a vertically disposed absorption zone maintained under conditions sufficient to absorb $C_3$–$C_4$ hydrocarbons in hereinafter specified absorption medium;

(d) subjecting said fourth liquid stream to first distillation means under conditions including sub-atmospheric pressure sufficient to produce a distillate fraction comprising light gas oil and a first bottoms fraction comprising residuum;

(e) introducing light gas oil and third liquid stream into the upper section of said absorption zone as part of said specified absorption medium;

(f) passing said first liquid fraction to second distillation means under conditions sufficient to produce an overhead fraction containing $C_3$–$C_4$ hydrocarbons and a second bottoms fraction comprising $C_5$+ material;

(g) passing a portion of said second bottoms fraction into an intermediate section of said absorption zone as part of said specified absorption medium;

(h) removing from said absorption zone a fourth gaseous stream containing acid gas, $C_1$ and $C_2$ hydrocarbons, and a rich absorption medium containing $C_3$–$C_4$ hydrocarbons;

(i) passing said rich absorption medium into said second distillation means of step (f) in admixture with said first liquid fraction; and, (j) removing first bottoms fraction, second bottoms fraction, $C_3$–$C_4$ overhead fraction, and fourth gaseous stream as product streams.

A more specific embodiment of the present invention includes the method described hereinabove wherein said fourth liquid stream is substantially free of hydrogen and said $C_3$–$C_4$ overhead fraction of step (f) contains at least 85% by weight of the $C_4$ hydrocarbons present in said effluent.

It can be seen from the above description that the present invention is a series of interrelated and interdependent processing steps wherein gaseous hydrocarbons are separated from relatively heavy hydrocarbons in a facile and economical manner resulting in usually high recovery of the relatively light hydrocarbons, such as the $C_4$ hydrocarbons, from the effluent of a hydrocracking reaction zone. The essence of the present invention is an improved method for recovering distillable hydrocarbons from the effluent of a residuum hydrocracking reaction zone.

As used in the context of the present invention, the term "residuum" when applied to the feed material of the present inventive method encompasses broadly petroleum crude oils, particularly the heavy oils extracted from tar sands, topped or reduced crudes, and vacuum residuums. Most of these residuum materials which have been hydrocracked prior to entry into the method of the present invention, have a gravity less than 20° API at 60° F. and a significant proportion of these residuums have a gravity of less than 10. The material which has been hydrocracked, as more fully discussed hereinbelow, is generally further characterized by a boiling range indicating that 10% or more boils above a temperature of about 1050° F. Commonly, these high molecular weight materials are called "black oils" and are the source of more valuable liquid hydrocarbons due especially to the advent of the hydrocracking reaction. The conversion of a significant proportion of the material into distillable hydrocarbons, i.e., those boiling below about 1050° F., would have been totally impossible without the hydrocracking reaction. Therefore, it is to be understood that the present invention has unique applicability to the separation of the effluent from a residuum hydrocracking reaction zone. Those skilled in the art, however, will recognize that certain of the unique features of the present invention are equally applicable to feed streams which may be obtained from other sources than a residuum hydrocracking zone.

The present invention has advanced the art by discovering that effluents of the type referred to hereinabove have unusually high hydrogen absorption, i.e., an excessive amount of hydrogen gas is absorbed in the relatively heavy conversion products from the reaction zone. In most of the hydrotreating processes of the prior art, including hydrocracking of materials other than residuums, the effluent from the reaction zone is passed into a separation means maintained at relatively high pressure and temperature wherein the hydrogen gas is flashed off and recovered for recycle purposes. Typically, 90 to 95% of the hydrogen contained in the effluent is recovered via this relatively simple one stage equilibrium flash operation. However, it has now been found that the equilibrium single stage flash operation does not in fact achieve significant recovery of the hydrogen from the effluent stream. Subsequently, therefore, the presence of the high amount of hydrogen in solution with the relatively heavy hydrocarbons created a situation not only whereby large hydrogen losses were encountered, but that the attendant distillation facilities for recovering the distillable hydrocarbons had to be excessively large in size in order to handle the tremendous quantities of vapor loading in the towers.

Accordingly, as previously mentioned, the unique series of processing steps of the present invention enable the operator to economically separate the hydrogen, acid gas, and light hydrocarbons from the other distillable hydrocarbons so that minimum capital investment is required for construction of the facility and minimum operating expense in terms of product loss is incurred.

As previously mentioned, the process of the present invention is particularly directed towards the handling of the effluent obtained from the catalytic conversion of black oils into distillable hydrocarbons. Specific examples of the black oils which have been converted to produce the effluent which is the feed stream for the present fractionation method, include vacuum tower bottoms product having a gravity of about 7.1° API at 60° F., containing 4.05% by weight of sulfur and 23.7% by weight of asphaltic material; a "topped" Middle East Kuwait crude oil having a gravity of 11.0° API at 60° F. containing 10.1% by weight of asphaltines and 5.20% by weight of sulfur; and vacuum residuum having a gravity of about 8.8° API at 60° F. containing 3.0% by weight of sulfur and 4300 p.p.m. of nitrogen and having a 20.0% volumetric distillation point of 1055° F. Operating conditions are maintained for the hydrocracking reaction such that conversions of up to 80% by volume of such material into distillable hydrocarbons has been achieved.

Conventionally, the operating conditions necessary for the catalytic hydrocracking of residuums as contemplated herein, include a temperature from 700° F. to 900° F., pressures from 1000 p.s.i.g. to 4000 p.s.i.g., liquid hourly space velocities from 0.25 to 2.0, and the presence of hydrogen in an amount from 1000 to 10,000 s.c.f./b. sufficient to convert at least 75% by weight of the feed material into distillable hydrocarbons.

The preferred manner of operating the hydrocracking reaction is to use a catalytic composite disposed within a reaction zone. Preferably, the catalyst comprises a metallic component having hydrogenating activity and is usually deposited with a refractory inorganic oxide carrier material of either synthetic or natural origin. The precise composition and method of manufacturing the catalyst is not considered essential to the present process and is well known to those skilled in the hydrocracking art. Typically, however, a siliceous carrier, such as 88.0% alumina and 12.0% silica, or 63.0% alumina and 37.0% silica, have been satisfactorily used. Those skilled in the art also recognize that suitable metallic components having hydrogenation activity are those selected from the group consisting of the metals of Groups VI–B and VIII of the Periodic Table as indicated in the Periodic Chart of the Elements, Fisher Scientific Company (1953). Thus, satisfactory catalytic composites for use in the hydrocracking reaction of residuums may comprise one or more metallic components from the group of molybdenum, tungsten, chromium, iron, cobalt, nickel, platinum, palladium, iridium, osmium, rhodium, ruthenium, various mixtures thereof, etc. The concentration of the catalytically active metallic component or components, as the case may be, is primarily dependent upon the particular metal as well as the characteristics of the charge stock. For example, the metallic components of Group VI–B are preferably present in an amount in the range from about 1.0% to about 20% by weight, the iron group metals in an amount within the range of about 0.2% to about 10% by weight, whereas the platinum group metals are preferably present in an amount within the range from about 0.1% to about 5% by weight, all of which are calculated as if the components existed within the finished catalytic composite as the elemental metal.

The refractory inorganic oxide carrier material may also comprise alumina, silica, zirconia, magnesia, titania, boria, strontia, hafnia, and mixtures of two or more including silica-alumina, alumina-silica-boron phosphate, silica-zirconia, silica-magnesia, silica-titania, alumina-zirconia, alumina-magnesia, alumina-titania, magnesia-zirconia, titania-zirconia, magnesia-titania, silica-alumina-zirconia, alumina-silica-magnesia, silica-alumina-titania, silica-magnesia-zirconia, silica-alumina-boria, etc. It is preferred to utilize a carrier material containing at least a portion of silica and, preferably, a composite of alumina and silica with alumina being in the greater proportion.

Before proceeding to a discussion of the appended drawing, it is to be emphasized that the present invention has unique applicability to the handling of the effluent from a "black oil" hydrocracking reaction zone. For definition purposes, a "black oil" is intended to embody a hydrocarbonaceous mixture of which as least 10.0% boils above a temperature of about 1050° F. and which has a gravity ° API at 60° F. of 20.0 or less. Additionally, "distillable hydrocarbons" are those normally liquid hydrocarbons, including pentanes, having boiling points below about 1050° F. Conversion conditions in the hydrocracking reaction zone are intended to be those conditions imposed upon the conversion zone in order to convert a substantial portion of the black oil into distillable hydrocarbons. Since the bulk of the reactions are exothermic, the reaction zone effluent will be at a higher temperature than the inlet temperature. In order that catalyst stability be preserved, those skilled in the are will recognize that it is distinctly preferable to control the inlet temperature such that the effluent temperature does not exceed about 900° F. Typically, hydrogen is admixed with the black oil charge stock by means of compressive recycle in an amount less than about 10,000 s.c.f./B. at the selected operating conditions. Although the present process embodies carrying out the hydrocracking reaction in a batchwise fashion, naturally it readily lends itslef to a more economical continuous processing in an enclosed vessel through which the mixture of hydrocarbon charge stock and hydrogen is passed. When conducted as a continuous process, it is particularly preferred to introduce the mixture into the vessel in such a manner that the materials pass through the vessel in downward flow. The internals of the vessel may be constructed in any suitable manner capable of providing the required ultimate contact between the liquid charge stock, the gaseous mixture, and the catalyst. In some instances it may be desirable to provide the reaction zone with a packed bed or beds of inert materials, such as particles of granite, porcelain, sand, aluminum, or other metal turnings, etc., to facilitate distribution of the charge or to employ perforated trays or special mechanical means for this purpose.

For the purpose of demonstrating the illustrative embodiment as represented by the appended drawing, it is to be noted that the feedstock for the inventive part of the present fractionation method will utilize an effluent which has been produced in accordance with the information presented hereinabove. The drawing will be described particularly in connection with the conversion of a vacuum residuum charge stock in a commercially scaled plant. It is to be understood that the charge stocks, stream compositions, operating conditions, design of fractionator separators, and the like, are exemplary only and may be varied widely without departure from the spirit of the invention.

Referring now to the appended drawing, a vacuum residuum having the properties set forth below is introduced inot the process via line 10:

| | |
|---|---|
| Gravity °API at 60° F. | 8.8 |
| Sulfur, wt. percent | 3.0 |
| Nitrogen, p.p.m. | 4300 |
| Conradson carbon residue, wt. percent | 16.0 |
| Heptane-insoluble asphaltenes, wt. percent | 6.5 |
| Distillation ASTM _____ deg. F__ | D1160 |
| Initial boiling point _____ deg. F__ | 690 |
| 2% _____ deg. F__ | 860 |
| 5% _____ deg. F__ | 950 |
| 10% _____ deg. F__ | 1000 |
| 20% _____ deg. F__ | 1055 |
| Molecular weight (est.) | 600 |
| Total metals p.p.m. | 100 |

After appropriate heat exchange, the charge stock in admixture with recycle hydrogen having been admixed with the feed via line 11, is passed into hydrocracking conversion zone 13 via line 12. The temperature of the material in line 12 is typically 800° F. and is maintained at a pressure of about 2685 p.s.i.g.

Reactor 13 has disposed therein a catalytic composite of 16.0% by weight molybdenum and 2.0% by weight of nickel calculated as the elements and based upon the total composite. The carrier material for the catalyst consists of 68.0% by weight of alumina, 12.0% by weight of silica, and 22% by weight of boron phosphate. The fresh charge rate to the reactor is such that the liquid hourly space velocity (of the fresh feed) is 0.5. By means not shown, it is understood that there can be a hot recycle stream being admixed with the feed stream and passed into the reactor. With respect to the hot recycle, combined feed ratios of from about 1.25 to about 3.0 are well suited for operation of the present hydrocracking process as is well known to those skilled in the art.

The effluent from reactor 13 at a temperature of about 875° F. and a pressure of about 2535 p.s.i.g. passes through line 14 into hot separator 15. It should be noted that the pressure has been reduced only to the extent of the normal pressure drop through the system. Additionally, cooling is also effectuated to some extent of the material in line 14. Therefore, separator 15 may typically be operated at a temperature of 750° F. and a pressure of 2535 p.s.i.g.

In separation zone 15 a hydrogen-containing vapor stream is removed from the zone via line 16 and recycled to the reaction zone via line 11 as previously mentioned. Makeup hydrogen may be added as necessary to the system via line 17.

Separator 15 is also operated such that a second gaseous fraction comprising acid gas ($H_2S$) and $C_1$ to $C_4$ hydrocarbons are removed therefrom via line 18. Also, a first liquid fraction is removed from separator 15 via line 19 and comprises $C_3$ to 550° F. material and, finally, a relatively heavy material, or second liquid fraction containing 550° F.+ material, is removed from separator 15 via line 20. The second liquid fraction, or material boiling above about 550° F., is introduced into a second separation means 21 by passing through line 20. Separator 21 is maintained under conditions of temperature of about 735° F. and at significantly lower pressure, e.g., 65 p.s.i.g., in order to further flash off additional hydrogen, acid gas, and light hydrocarbons so that economical recoveries thereof may be achieved. These conditions which are maintained in separation zone 21 are such that a third gaseous stream containing acid gas ($H_2S$) and $C_1$ to $C_4$ hydrocarbons are removed via line 22. Additionally, a third liquid stream containing $C_6$ to 550° F. material is removed from the zone via line 33 and a fourth liquid stream containing 550° F.+ material is removed from separation zone 21 via line 34.

The second gaseous fraction contained in line 18 and the third gaseous stream contained in line 22 are preferably admixed and passed via line 23 into vertically deposed absorption zone 24 which is maintained under conditions sufficient to absorb the $C_3$-$C_4$ hydrocarbons into a hereinafter specified absorption medium.

The relatively heavy material, or fourth liquid stream in line 34, is passed into vacuum tower 35 for the separation thereof into various desirable components. A gaseous stream containing residual hydrogen gas, acid gas, and $C_1$ hydrocarbons are removed from vacuum tower 35 via line 36 and passed into, for example, a refinery fuel system. Vacuum tower 35 is maintained under usual vacuum distillation conditions, including sub-atmospheric pressures, sufficient to produce a distillate fraction comprising light gas oil in line 37, a heavy gas oil in line 40, and an extremely heavy vacuum residuum material in line 39. By means not shown, suitable cut-back material may be added to vacuum tower 35 in order that the vacuum tower bottoms may be pumpable and more easily removed from the vacuum tower. Alternatively, the heavy gas oil material in line 40 may not be withdrawn but may be dropped to the bottom of the vacuum tower and withdrawn from the system as a residuum of the process.

The light gas oil removed from vacuum tower 35 via line 37 is admixed with the third liquid stream in line 33 to provide a material in line 38 which is added to hereinabove mentioned absorption zone 24 at the upper portion thereof. The material in line 38, therefore, comprises one part of the specified absorption medium.

The first liquid fraction recovered from separation zone 15 via line 19 is passed via line 27 into a stripper column 28 maintained under sufficient conditions to produce an overhead fraction comprising light hydrocarbons which are removed via line 29 and a stripper column bottoms comprising a desirable stabilized conversion product which is removed from the process via lines 30 and 31. The material in line 31 which is removed from the process comprises a desirable stabilized conversion product and usually is $C_{5+}$ material.

A portion of the $C_{5+}$ material is passed via line 32 into absorption zone 24 at an intermediate location thereof. Thus, the material in line 32 comprises another portion of the specified absorption medium. In absorption zone 24 the feed material in line 23 comprises an exorbitantly high amount of gaseous material, including acid gas ($H_2S$). This large volume of gas passes in upward fashion through absorption zone 24 in counter-current relationship to the downflowing parts of the absorption medium having been added thereto via lines 38 and 32. It is important to note that the material in line 32 in addition to being characterized as a $C_{5+}$ material, as a matter of fact contains some considerable quantities of $C_4$ material, e.g., 3.0 mol percent. In order to maximize the recovery of $C_4$ hydrocarbons, it was found that the large amount of gas passing up the column had the tendency to strip the $C_4$ and lighter components from the material being added via line 32 thereby causing loss of this material which leaves the absorber zone 24 via line 25. Accordingly, the present invention minimized the loss of this material by adding to the upper section of absorption zone 24 the relatively heavy material via line 38 which absorbs the stripped $C_4$ and lighter material coming up the column thereby rendering the material removed via line 25 to a composition comprising almost entirely acid gas, $C_1$ and $C_2$ hydrocarbons being substantially free from $C_3$ and $C_4$ hydrocarbons. The rich absorption medium, comprising the relatively heavy hydrocarbons having been added via lines 32 and 38, having absorbed therein the residual $C_3$ and $C_4$ hydrocarbons brought into absorption zone 24 both by line 23 and line 32, is removed from absorption zone 24 via line 26 and subsequently passed into stabilizer column 28 in admixture with the first liquid material being removed from separator 15 via line 19, said admixture being passed into distillation column 28 via line 27.

Finally, the acid gas and $C_1$ to $C_2$ hydrocarbons are removed from absorption zone 24 via line 25 and passed into sulfur recovery means or into a refinery fuel system for use as fuel therein. Accordingly, the illustrative embodiment of this invention recovers from the effluent of a residuum hydrocracking zone as product streams a first bottoms fraction comprising $C_{5+}$ hydrocarbons, a second bottoms fraction comprising resid, a $C_3$–$C_4$ overhead fraction, and a fourth gaseous stream comprising acid gas and $C_1$ to $C_2$ hydrocarbons. It is to be noted that this separation has been accomplished in a more facile and economical manner than has heretofore been possible. It is also to be noted that without the operation of the present invention, the size and operation of vacuum tower 35 would have been tremendous. Due to the high hydrogen absorption or solution characteristics, the material in line 34 normally would contain such a large amount of gas that the diameter of vacuum column 35 would indeed be extremely larger than the diameter of the existing tower 35 as practiced by the present invention.

Therefore, an embodiment of the present invention includes the concept that the fourth liquid stream (shown as line 34 in the appended drawing) is substantially free of hydrogen and that the $C_3$–$C_4$ overhead fraction depicted as line 29 contains at least 85% by weight of the $C_4$ hydrocarbons present in the effluent stream depicted as line 14. The present invention is intended to embody the situation where the various product streams described herein contain minor constituents of the other streams due to the relative inefficiency of the prior art separating means which is utilized in the present invention in such a unique manner. Thus, for example, the material in line 25 which comprises the acid gas, light paraffinic hydrocarbons, such as the $C_1$ and $C_2$ paraffinic hydrocarbons, may also contain very minor quantities of propanes, butanes and pentanes. This is not intended, however, to diminish the scope of the present invention but is intended to explain certain inherent inefficiencies in operating a process of this type.

As an illustration of the invention described with reference to the appended drawing, a component analysis of the principal streams is given in the following table and is presented on a basis of mols per hour. The fresh charge rate is 245 mols per hour and the hydrogen makeup rate is 1651 mols per hour of which 1610 mols are hydrogen, 39 mols are methane, and 2 mols are nitrogen. The line designations refer to the lines depicted in the appended drawing discussed hereinabove.

TABLE I

| | Raw Oil | Recycle Gas | Total to Effluent | Total Effluent | Hot Separ. Vapor | $H_2$ Make Up | Cold Flash Drum Gas | Cold Flash Drum Net Liquid | Hot Separ. Net Liquid | Hot Flash Rec. Gas to Absorb | Total Rich Gas to Treat | Absorq Lean Gas to Treat |
|---|---|---|---|---|---|---|---|---|---|---|---|---|
| | (10) | (11) | (12) | (14) | (16) | (17) | (18) | (19) | (20) | (22) | (23) | (25) |
| $NH_3$ | | | | 17 | 17 | | | | | | | |
| $N_2$ | | 27 | 31 | 31 | 29 | 2.5 | 1.5 | 1.5 | 1.0 | 1.0 | 2.5 | 2.5 |
| $H_2S$ | | 136 | 152 | 247 | 217 | | 63.8 | 81.1 | 13.7 | 12.7 | 76.5 | 58.3 |
| $H_2$ | | 3,700 | 5,491 | 4,175 | 3,834 | 1,610.0 | 133.2 | 134.0 | 160.0 | 158.2 | 291.4 | 291.6 |
| $C_1$ | | 452 | 520 | 594 | 539 | 38.8 | 82.8 | 85.9 | 26.4 | 25.9 | 108.7 | 104. |
| $C_2$ | | 74 | 85 | 129 | 108 | | 29.0 | 34.1 | 9.8 | 9.1 | 38.1 | 32.1 |
| $C_3$ | | 58 | 67 | 110 | 93 | | 23.0 | 34.8 | 8.5 | 7.4 | 30.4 | 15.8 |
| $i$-$C_4$ | | 10 | 12 | 21 | 17 | | 3.3 | 7.0 | 1.9 | 1.5 | 4.8 | 1.0 |
| $n$-$C_4$ | | 20 | 25 | 47 | 38 | | 7.1 | 17.4 | 4.3 | 3.1 | 10.2 | 2.7 |
| $i$-$C_5$ | | 5 | 7 | 16 | 12 | | 1.7 | 7.2 | 1.7 | 1.0 | 2.7 | 0.6 |
| $n$-$C_5$ | | 4 | 6 | 15 | 11 | | 1.5 | 7.2 | 1.7 | 0.9 | 2.4 | 0.5 |
| $C_6$ | | 5 | 10 | 32 | 23 | | 1.9 | 18.0 | 4.2 | 1.3 | 3.2 | 0.6 |
| 250 | | 2 | 14 | 65 | 42 | | 0.6 | 40.0 | 11.2 | 0.6 | 1.2 | 0.3 |
| 350 | | | 12 | 51 | 28 | | | 27.5 | 11.1 | 0.1 | 0.1 | |
| 450 | | | 16 | 51 | 21 | | | 20.9 | 13.7 | | | |
| 550 | | | 32 | 82 | 22 | | | 21.8 | 28.4 | | | |
| 650 | | | 38 | 82 | 10 | | | 10.5 | 33.7 | | | |
| 750 | | | 44 | 87 | 4 | | | 3.7 | 39.2 | | | |
| 850 | | 16 | | 57 | 78 | 1 | | 0.7 | 35.9 | | | |
| 950 | | 28 | | 68 | 75 | | | | 35.0 | | | |
| 1,050 | | 60 | | 96 | 68 | | | | 32.3 | | | |
| 1,150 | | 141 | | 192 | 96 | | | | 45.2 | | | |
| | 245 | 4,493 | 6,975 | 6,169 | 5,066 | 1,651.3 | 349.4 | 553.3 | 518.9 | 222.8 | 572.2 | 510.9 |
| P.p.h. | 147,000 | 27,900 | 313,000 | 313,000 | 60,500 | 3,930 | 6,750 | 32,230 | 118,400 | 2,400 | 9,150 | 6,350 |
| $M$ | 600 | 6.21 | 44.9 | 50.7 | 11.9 | 2.38 | 19.3 | 58.3 | 228 | 10.8 | 16.0 | 12.5 |
| B.p.d. | 10,000 | | | | | | | | 8,850 | | | |
| °API | 8.8 | | | | | | | | 22.5 | | | |
| $10^6$ c.f.d. H.V. | | 41.0 | | | 15.1 | 3.2 | | | | 2.0 | 5.2 | 4.6 |

TABLE I—Continued

| | Rich Oil (26) | Total Stabil. Feed (27) | Stabil. Ov. Hd. Gas to Treat (29) | Net Stabil. Botts (31) | Stabil. Botts to Absorb Tray #13 (32) | Hot Flash Rec. Liq. to Absorb (33) | Vacuum Column Charge (34) | Vacuum Column Gas (36) | LVGO to Absorb (37) | Lean Oil to Absorb Tray #1 (38) | Vacuum Column Botts (39) | HVGO (40) |
|---|---|---|---|---|---|---|---|---|---|---|---|---|
| $NH_3$ | | | | | | | | | | | | |
| $N_2$ | | | | | | | | | | | | |
| $H_2S$ | 19.0 | 36.3 | 36.3 | | | 0.8 | 0.2 | 0.2 | | 0.8 | | |
| $H_2$ | | 0.8 | 0.8 | | | 0.2 | 1.6 | 1.6 | | 0.2 | | |
| $C_1$ | 4.0 | 7.1 | 7.1 | | | 0.2 | 0.3 | 0.3 | | 0.2 | | |
| $C_2$ | 6.4 | 11.5 | 11.5 | | | 0.4 | 0.3 | 0.3 | | 0.4 | | |
| $C_3$ | 15.4 | 27.2 | 27.2 | | | 0.8 | 0.3 | 0.3 | | 0.8 | | |
| $i-C_4$ | 4.3 | 8.0 | 7.5 | 0.3 | 0.2 | 0.3 | 0.1 | 0.1 | | 0.3 | | |
| $n-C_4$ | 11.5 | 21.8 | 12.8 | 6.0 | 3.0 | 1.0 | 0.2 | 0.2 | | 1.0 | | |
| $i-C_5$ | 6.6 | 12.1 | 0.4 | 7.8 | 3.9 | 0.6 | 0.1 | 0.1 | | 0.6 | | |
| $n-C_5$ | 6.6 | 12.3 | 0.3 | 8.0 | 4.0 | 0.7 | 0.1 | 0.1 | | 0.7 | | |
| $C_6$ | 15.9 | 31.8 | | 21.1 | 10.7 | 2.6 | 0.3 | 0.3 | | 2.6 | | |
| 250 | 38.3 | 77.7 | | 51.4 | 26.3 | 9.3 | 1.3 | | 1.3 | 10.6 | | |
| 350 | 30.9 | 58.4 | | 38.7 | 19.7 | 9.1 | 1.9 | | 1.9 | 11.0 | | |
| 450 | 31.6 | 52.4 | | 34.8 | 17.7 | 10.1 | 3.6 | | 3.6 | 13.7 | | |
| 550 | 54.3 | 76.1 | | 50.7 | 25.4 | 16.9 | 11.5 | | 11.5 | 28.4 | | |
| 650 | 54.9 | 66.4 | | 44.3 | 22.1 | 13.4 | 20.3 | | 20.3 | 33.7 | | |
| 750 | 39.7 | 43.4 | | 28.9 | 14.5 | 7.6 | 31.6 | | 17.3 | 24.9 | | 14.3 |
| 850 | 4.6 | 5.3 | | 3.5 | 1.8 | 2.8 | 33.1 | | | 2.8 | | 33.1 |
| 950 | 0.7 | 0.7 | | 0.5 | 0.2 | 0.5 | 34.5 | | | 0.5 | | 34.5 |
| 1,050 | 0.1 | 0.1 | | 0.1 | | 0.1 | 32.2 | | | 0.1 | | 32.2 |
| 1,150 | | | | | | | 45.2 | | | | 45.2 | |
| | 345.6 | 549.5 | 103.9 | 295.6 | 150.0 | 77.4 | 218.7 | 3.5 | 55.9 | 133.3 | 45.2 | 114.1 |
| P.p.h | 61,920 | 87,400 | 4,120 | 55,160 | 28,120 | 16,000 | 100,000 | 100 | 15,000 | 31,000 | 29,400 | 55,500 |
| w | 180 | 159 | 39.7 | 187 | 187 | 207 | 457 | 28.6 | 268 | 232 | 650 | 485 |
| B.p.d | 5,208 | 7,468 | | 4,600 | 2,346 | 1,223 | 7,080 | | 1,162 | 2,385 | 1,900 | 4,000 |
| °API | 42.0 | 41.0 | | 40.5 | 40.5 | 26.5 | 14.5 | | 28.5 | 27.0 | 2.0 | 17.5 |
| $10^6$ c.f.d. H.V | | | 0.95 | | | | | 0.03 | | | | |

The composition analysis presented hereinabove are intended to be illustrative only and it must be understood that such component analysis may vary widely depending upon the precise characteristics of the charge stock, the flow rates, and the other operating variables including the particular desired product separation. However, the unique value of the present invention has enabled an operator to achieve for example, at least 85% recovery of the $C_4$ hydrocarbons contained in the effluent from a hydrocracking reaction zone while minimizing the capital investment costs of such a large item of investment as a vacuum resid tower. Additionally, the operating cost of maintaining a vacuum would be prohibitive if the feed were not flashed at a low pressure to remove substantially all of the non-condensibles.

The invention claimed:

1. Method for recovering relatively light hydrocarbons from a feed mixture containing acid gas, relatively light hydrocarbons, and relatively heavy hydrocarbons which comprises separating said feed mixture under a pressure from 1000 to 4000 p.s.i.g. into a vapor fraction comprising acid gas and relatively light hydrocarbons and a liquid fraction comprising said relatively heavy hydrocarbons, separating the relatively heavy hydrocarbons into a lower boiling hydrocarbon stream and a higher boiling hydrocarbon stream, passing said vapor fraction into an absorption zone in contact with hereinafter specified absorption medium under conditions sufficient to absorb relatively light hydrocarbons into said medium, introducing said higher boiling stream into the upper section of said zone as part of said medium, introducing said lower boiling stream into an intermediate section of said zone as another part of said medium, removing acid gas from said zone, and recovering relatively light hydrocarbons from the rich absorption medium from the absorption zone.

2. Method according to claim 1 wherein said absorption medium is passed into a stripping zone under conditions sufficient to produce an overhead fraction comprising relatively light hydrocarbons and a bottoms fraction comprising said lower boiling hydrocarbons containing 5% to 15% by mol of the total relatively light hydrocarbons present in said feed mixture.

3. Method according to claim 1 wherein said hydrocarbon feed mixture comprises the effluent from a residuum hydrocracking reaction zone.

4. Method according to claim 3 wherein said relatively light hydrocarbons comprise $C_3$ and $C_4$ hydrocarbons.

5. Method according to claim 3 wherein said relatively light hydrocarbons comprise $C_4$ hydrocarbons.

6. Method for separating the effluent from a residuum hydrocracking reaction zone which comprises the steps of:
 (a) passing said effluent at relatively high pressure and high temperature into first separation means to produce
  (i) a first gaseous fraction comprising hydrogen,
  (ii) a second gaseous fraction containing acid gas and $C_1$ to $C_4$ hydrocarbons,
  (iii) a first liquid fraction containing $C_3$ to 550° F. material, and
  (iv) a second liquid fraction containing 550° F.+ material;
 (b) introducing said second liquid fraction into second separation means under conditions sufficient to produce
  (i) a third gaseous stream containing acid gas and $C_1$ to $C_4$ hydrocarbons,
  (ii) a third liquid stream containing $C_6$ to 550° F. material, and
  (iii) a fourth liquid stream containing 550° F.+ material;
 (c) passing said second gaseous fraction and said third gaseous stream into a vertically disposed absorption zone maintained under conditions sufficient to absorb $C_3$–$C_4$ hydrocarbons in hereinafter specified absorption medium;
 (d) subjecting said fourth liquid stream to first distillation means under conditions including subatmospheric pressure sufficient to produce a distillate fraction comprising light gas-oil, and a first bottoms fraction comprising residuum;
 (e) introducing light gas-oil and third liquid stream into the upper section of said absorption zone as part of said specified absorption medium;
 (f) passing said first liquid fraction to second distillation means under conditions sufficient to produce an overhead fraction containing $C_3$–$C_4$ hydrocarbons and a second bottoms fraction comprising $C_5$+ material;
 (g) passing a portion of said second bottoms fraction into an intermediate section of said absorption zone as part of said specified absorption medium;
 (h) removing from said absorption zone a fourth gaseous stream containing acid gas, $C_1$, and $C_2$ hydrocarbons and a rich absorption medium containing $C_3$–$C_4$ hydrocarbons;
 (i) passing said rich absorption medium into said second distillation means of step (f) in admixture with said first liquid fraction; and (j) removing first bottoms fraction, second bottoms fraction, $C_3$–$C_4$ overhead fraction, and fourth gaseous stream as product streams.

7. Method according to claim 6 wherein said fourth liquid stream is substantially free of dissolved hydrogen.

8. Method according to claim 6 wherein said $C_3$–$C_4$ overhead fraction of step (f) contains at least 85% by weight of the $C_4$ hydrocarbons originally present in said effluent.

9. Method according to claim 6 wherein said effluent is produced by subjecting residuum material to catalytic hydrocracking conditions, including a temperature from 700° F. to 900° F., pressure of hydrogen in an amount from 1000 to 10,000 s.c.f./b., sufficient to convert at least 75% by weight of said residuum into distillable hydrocarbons.

10. Method according to claim 9 wherein said fourth liquid tsream is substantially free of hydrogen and said $C_3$–$C_4$ overhead fraction of step (f) contains at least 85% by weight of the $C_4$ hydrocarbons present in said effluent.

References Cited

UNITED STATES PATENTS

| | | | |
|---|---|---|---|
| 2,181,302 | 11/1939 | Keith et al. | 208—101 |
| 2,573,341 | 10/1951 | Kniel | 208—101 |
| 2,900,326 | 8/1959 | Gilmore | 208—101 |
| 2,918,425 | 12/1959 | Berger et al. | 208—108 |
| 3,154,482 | 10/1964 | Cahn et al. | 208—101 |

HERBERT LEVINE, *Primary Examiner.*

U.S. Cl. X.R.

208—97, 208